I. L. DAWSON.
CORN SHOCKER.
APPLICATION FILED FEB. 26, 1908.
949,978.
Patented Feb. 22, 1910.
2 SHEETS—SHEET 1.
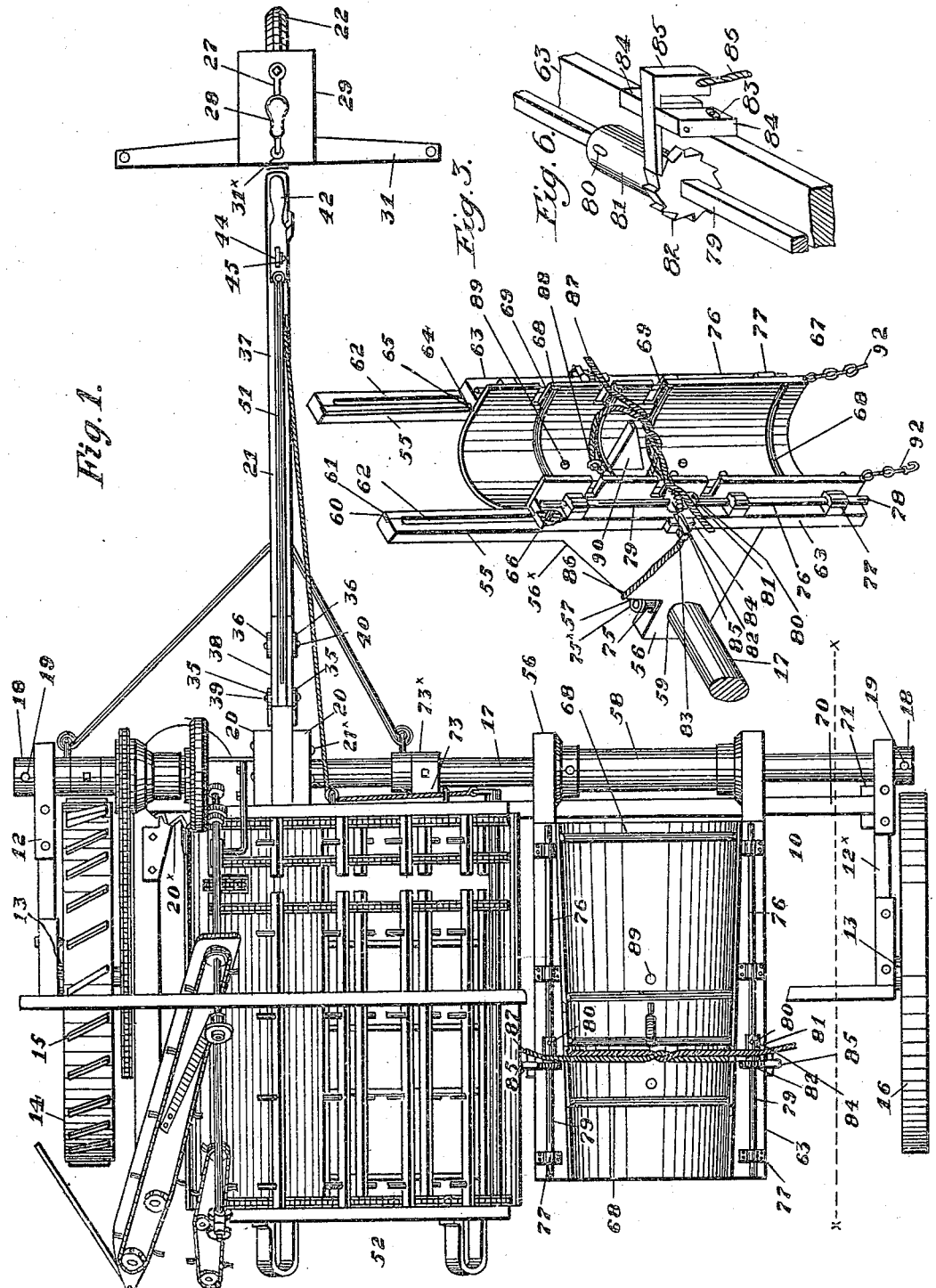
Witnesses
C. L. Brown
S. L. C. Hasson
Inventor
Isaac L. Dawson
By Richey & Manning
Attorneys I. L. DAWSON.
CORN SHOCKER.
APPLICATION FILED FEB. 26, 1908.
949,978.
Patented Feb. 22, 1910.
2 SHEETS—SHEET 2.
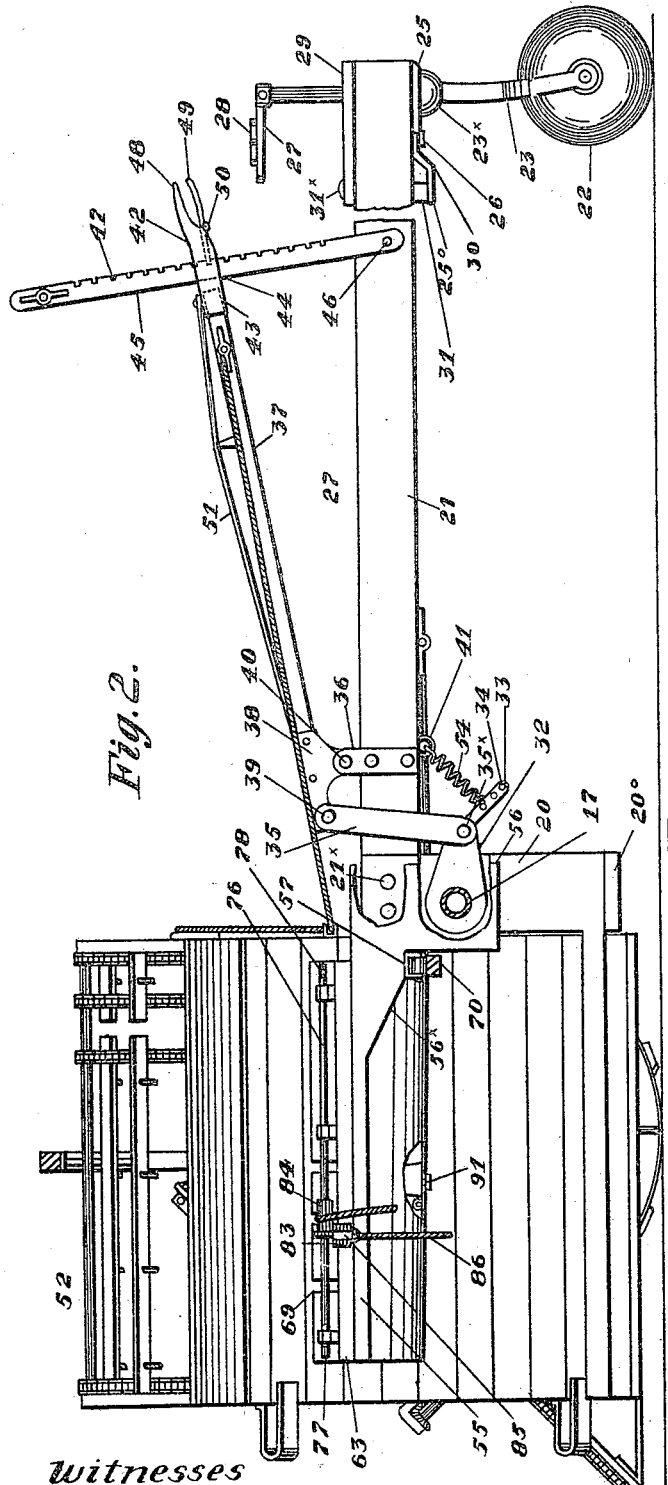
Witnesses
C. L. Bronson
L. L. Husson
Inventor
Isaac L. Dawson
By Richard Manning
Attorney

UNITED STATES PATENT OFFICE.

ISAAC L. DAWSON, OF KANSAS CITY, MISSOURI.

CORN-SHOCKER.

949,978.

Specification of Letters Patent.     Patented Feb. 22, 1910.

Application filed February 26, 1908. Serial No. 417,928.

*To all whom it may concern:*

Be it known that I, ISAAC L. DAWSON, a citizen of the United States of America, residing at Kansas City, in the county of Jackson and State of Missouri, have invented certain new and useful Improvements in Corn-Shockers; and I do hereby declare that the following is a full, clear, and exact description of the invention, such as will enable others to make and use the same, reference being had to the accompanying drawings, forming a part of this specification.

The object of the invention is: First, a receiver for stalks of corn which have been harvested, capable of being raised and lowered in position and the stalks discharged therefrom. Second, the movement of a shock of corn in a harvesting machine to and from the elevator, in position to drop in rear of the machine. Third, the compression of the stalks before dropping upon the ground. Fourth, to support the shocker and its load under an adjustable tension.

The invention consists in the novel construction and combination of parts, such as will be first fully described and then specifically pointed out in the claims.

In the drawings, Figure 1, is a plan view of a corn harvester, showing the improved corn shocker. Fig. 2, is a side view of a corn harvester, looking in the direction of the back of the elevator upon the harvesting machine and taken upon the line $x$, $x$, on Fig. 1. Fig. 3, is a detail view in perspective of the improved corn shocker in an upset or discharging position, showing a portion of the supporting shaft. Fig. 4, is a view in plan of the corn shocker inverted in position. Fig. 5, is a detail view in perspective, of the supporting shaft and bar for the shocker. Fig. 6 is a detail view in perspective of the mechanism controlling the winding and unwinding of the ends of the stalk compressing band.

Similar numerals of reference indicate corresponding parts in all the figures of the drawings.

Referring to the drawings, 10, indicates the main supporting frame of a corn harvester which consists of parallel side beams 12, $12^x$, which are arranged in position a wide distance apart and are short in length. Upon the forward ends of the side beams 12 and $12^x$, are stud shafts 13, upon one of which stud shafts is mounted the main driving wheel 14, upon the periphery of which are the ordinary obliquely arranged traction lugs 15. Upon the other shaft is the idle or supporting wheel 16, which wheels 14, and 16, are of the same circumference. The rear ends of the side beams 12, $12^x$, extend but a short distance in rear of the wheels 14 and 16, and through said ends extend transversely the ends of a non-rotating connecting shaft, 17. This shaft is preferably hollow, and to sustain the weight superimposed by the shock of corn, is of considerable size. The shaft 17, is secured fixedly to the side beams 12, $12^x$ by means of the collars 18, secured to the ends of the shafts by the bolts 19, which collars bear upon the outer surfaces of said beams.

At a point on the shaft 17, the requisite distance from the side beam 12, to give direct power to the main drive wheel 14, and support the stalk cutting devices, are mounted the vertical suspensory plates 20, which are arranged a short distance apart and loosely on the fixed shaft 17. These suspensory plates support a horizontal platform, one end of which is seen at 20°, and which platform supports the rotary stalk cutting devices as seen at $20^x$, in Fig. 1, the stalk cutting devices forming the subject matter of a previous application, and further reference thereto is unnecessary in the present application.

Between the upper ends of the suspensory plates 20, extends the forward end of the horizontal push beam 21, whch is bolted firmly by the bolts $21^x$, to the upper ends of said plates, which extend a short distance above the line of shaft 17. The rear end of the push beam extends as far rearwardly as is necessary for hitching a team of horses to the beam. The rear end of the beam 21, is mounted upon a swivel or caster wheel 22. This wheel is journaled between the lower forked ends of the vertical pivot post 23, upon which is cast a boss $23^x$, upon which the rear end of the beam 21, is caused to bear, a bearing plate 25, being secured by the bolts 26, to the lower or under surface of the beam which bears directly upon the boss $23^x$. The upper end of the pivot post 23, extends in a vertical direction through the plate 25 and the beam 21, and to a position a considerable distance above the upper surface of the beam. A wheel guiding or steering arm 27, is connected at one end with the upper end of the pivot post 23, upon which arm is secured a seat 28.

Upon the upper surface of the rear end of beam 21, is a broad plate 29, secured firmly to said beam and through which the pivot post 23 is passed. Upon this plate 29, the driver stands in the forward movement of the corn harvester. A short portion of the bearing plate 25, which forms a strap 25°, is bent downwardly at 30, and extended forwardly a short distance and upon said portion 30 of the plate 25, is mounted the doubletree 31, secured to the pivot bolt 31$^x$, which passes through the beam 21, and the strap 25°. To the ends of the doubletree the horses are attached in the application of power to move the harvester in a forward direction.

Upon the hollow connecting shaft 17, between the vertical suspensory plates 20, is connected rigidly the enlarged inner end portion of a crank arm 32, which extends rearwardly from the shaft and upon the outer end of said arm is a downwardly inclined extension 33, which is perforated at intervals in the direction of its length as at 34 (see Fig. 2). Upon each side of the beam 21, a short distance rearwardly from its point of connection with the suspensory plates are short connecting bars 35, the lower ends of which bars are pivotally connected at 35$^x$ with the outer end of the crank arm 32, near the extended portion 33. Bolted to the sides of beam 21, are fulcrum plates 36, the upper ends of which plates extend a short distance above the line of the upper surface of the beam, and upon which plates are fulcrumed as further described the raising and lowering lever 37, by means of which the frame supporting the shocker is raised and lowered in position. To the sides and forward end of the lever 37, are riveted the plates 38, the forward ends of which plates extend to and between the upper ends of the connecting bars 35, and connected therewith by the pivot bolt 39. A portion of the plates 38, a short distance in rear of their pivotal point of connection with the bars 35, extend downwardly a short distance, its lower portion being curved outwardly in the arc of a circle and pivotally connected by the pivot bolt 40, with the fulcrum plate 36. With the extension 33 of the crank arm 32 is adjustably connected one end of a spiral spring 54, the other end of which spring is connected with an eye bolt 41, secured to the lower surface of the beam 21, near the fulcrum plates 36.

Upon the rear end of the lever 37, is a cast extension or handle 42, having socket 43, fitted to said rear end of the lever. In the casting is a vertical opening 44, through which extends the upper end of a notched bar 45, the lower end of which bar is pivotally connected by the pivot bolt 46, to the side of beam 21. In the rear surface of bar 45, are notches 47, spaced apart in the longitudinal direction of said bar. The lower surface and rear end of the handle 42, is cut away at 48, in an upwardly curved line. Beneath said curved portion of the handle is a detent or latch 49, secured by the pivot 50, to said handle, the forward end of which detent extends within the hollow handle 42 and engages with the notches 47, in the bar 45.

51 indicates a truss rod secured at one end to the upper surface and forward end of the handle 42, and at the other end to the forward end of the lever 37.

52 indicates an elevator for elevating the corn stalks severed by the rotary cutter 20$^x$, the construction and operation of which are fully set forth in a previous application.

The shock former or shocker consists first of a dumping carriage, the sides of which are composed of parallel bars 55, the rear ends of which bars are rigidly connected with the upper surface of upwardly extended blocks or brackets 56, the upper portions of which brackets are increased in length and the forward surface extended from the bars 55, are downwardly and rearwardly inclined at 56$^x$, terminating in a notch 57. The lower portions of the said blocks 56, are secured to the ends of a sleeve 58, and through the said blocks extend the openings 59, which are in line with the opening in the sleeve 58. These brackets are arranged the distance apart requisite to the size of the shocker, and the sleeve and brackets are loosely mounted on the shaft 17, on the vertically movable frame 10, and slidable in the longitudinal direction of the said shaft. In the upper surface and in the direction of the inner side of said bars are longitudinally extended rabbets 60, within which are the longitudinal flat bars 61. In the bars 55, are longitudinal slots 62, extending nearly to the brackets 56. Upon the upper surfaces of the bars 55, are longitudinal slidable bars 63, the inner portions of which bars are increased in width from the rear in the direction of the forward ends a short distance. In the lower surface of these bars 63, and in the direction of the inner sides of said bars, are longitudinal rabbets 64, in which are secured the longitudinal bars 65, which come into frictional contact with the bars 61, on the slotted bars 55. With the lower surfaces and forward ends of the upper bars, 63, are secured the guiding pins 66, which extend downwardly through the slots 62, in the bars 55, and provided with the heads 66$^x$. With the sliding bars 63, are connected the longitudinal side portions of a longitudinal receptacle or former 67, which is semi-circular in cross section and upon the inner surfaces of which are ribs 68, extending in the direction of the line of its cross section, one rib being placed near the rear end of the receptacle and the others in the direction of the forward end of the receptacle and spaced at equal distances apart. A portion of the sides of the receptacle 67, extends a short distance above the upper surfaces of the bars 63, and in which portions immediately forward of the series of forward ribs 68, are vertical slots 69, for the purpose hereinafter described.

Directly forward of and parallel with the shaft 17, is a guiding and supporting bar 70, for the shocker supported at one end to a cleat 71, secured rigidly to the lower surface of the side 12ˣ, at a point a short distance forward of shaft 17, and the other end of said bar is extended to a position in the direction of the other side 12, of the frame, directly beneath the elevator 52, and secured to the forwardly extended support 73, on the collar 73ˣ, fixed to the shaft 17 (see Fig. 5). This bar 70, is braced by means of a truss rod 74, connected at its ends with the cleat 71, and the bracket 73, respectively.

With the upper side of the notched portions 57, of the brackets 56, are connected the forked bearings 75ˣ, in which are journaled the rollers 75, which bear upon and rotate upon the upper surface of the guide bar 70.

For the purpose of compressing the stalks in the former or shocker rope, separate windlasses comprising winding rods or shafts 76, are rotatively mounted in the journal boxes 77, secured to the upper surface of the bars 63, near the ends of said bars and also at points intermediate said ends, the rods having squared portions as seen at 78, at the ends for the attachment of a winding handle or key (not shown). Portions of the rods 76, forward of the journal boxes intermediate the ends of bars 63, are made square as at 79, and upon said squared portions are mounted the sliding drums or sleeves 80, in which are set screws 81, so that the position of the drum may be changed when required. Upon these drums are fixedly connected the ratchet wheels 82. Upon the outer portions of the longitudinal bars 63, are secured by the screws 83, the lugs 84, in pairs and pivoted to said lugs are the dogs 85, which engage with the ratchet wheels 82, on the drums 80. With the dogs upon the respective sides of the receptacle 67, are connected the ends of a single rope 86, which extends beneath the receptacle 67, so as to be readily grasped when required to operate the dogs. The lugs 84, may be changed in position upon the bars 63, when the change is made of the drums 80, these drums being located opposite the slots 69, in the respective sides of the receptacle 67.

87 indicates the shock compressing rope within the receptacle 67, and which is of sufficient length to extend around the shock when formed in the receptacle, and of the proper strength for repeated use. This rope is connected at a point intermediate the ends by means of a screw 88, to the bottom of the receptacle as seen in Fig. 3.

In the bottom of the receptacle 67, between the ribs 68, are perforations 89.

90 indicates the retaining post for the shock, which consists of a block having an outwardly extended portion at right angles to the bottom of the receptacle and a downwardly and inwardly inclined portion, the form of the block being a right angle triangle. The base of the block is provided with a dowel 91, extending through the perforation 89, in the bottom of receptacle 67.

In operation, the stalks of corn to be formed into shocks are placed or fall into the receptacle or former 67, by gravity from the elevator 52, with the butts to the rear and are supported by the ribs 68. The ends of the compression rope 87, which is laid in the shocker or former 67, and transverse thereto, as soon as the shock is formed, are extended upwardly and past each other upon the outer portion of the shock and a single tie made with said ends and said ends extended downwardly within the slots 69, in the sides of the receiver or former 67, one in one direction and turned about and a bight formed with the end on the drum 80, on one bar 68, on the shocker and the other end of the rope extended over and a bight made in the rope on the drum on the rotary shaft on the other parallel bar supporting the former or shocker. The shafts 76, are then rotated in opposite directions, one being turned to the right and the other to the left, thus drawing upon both ends of the rope and compressing the stalks in the shock, the dogs 85, holding the ratchet wheels and shafts from reverse movement. The chains (92) are then hooked together. The lever 37 is then operated to lower the shaft 17, in position nearer the ground, thereby placing the shocker or former 67, in a rearwardly and downwardly inclined position, the movement being made gradual from the tension imparted to the spring 54, and the bars 63 supporting the shocker move or slide rearwardly and downwardly upon the lower supporting bars 55, on the brackets 56, to a position in which the pin 91, in the said upper bars 63, come into contact with the lower or rear ends of the slots 62, in the bars 55, at which point the shocker 67, is within a few inches of being upon a balance and the weight is over the wheels or rollers 75, on the said brackets 56, and supported by the bar 70, on the shocker raising and lowering frame. The shocker is then moved in position on the shaft 17, in the direction of the supporting wheel 16, of the harvester, a distance corresponding to the width of the shocker, the latter being virtually balanced on the shaft 17, and a slight movement given to the shocker tips the shocker rearwardly into a vertical position, the butts of the stalks being upon the ground, the drums 80 holding the compression rope firmly upon the stalks, the post 90 in the shocker retarding the shock from movement and relieving the strain upon rope 87, the ribs 68, also performing the duty of retarding the movement of the stalks. When the shock reaches the ground, the rope 86, is given a sharp pull, thus releasing the dogs 85, from the ratchet wheels 82, the expansion of the shock will release the ends of the rope 87, from its engagement with the shock and the shock remains standing in the field. The machine is moved forward a short distance, the shocker 67, placed in the inclined position prior to the discharge of the shock and the lever 37, on the beam 21, moved downwardly, thus placing the shocker into a horizontal position in readiness to receive the stalks for the formation of another shock. The operation of lowering the frame supporting the shocker with its load of stalks is gradually effected with the aid of the spring 54, the tension of the spring being regulated by changing the position of its lower end from one opening 34, in the extension 33, of the crank arm 32, on the shaft 17, of the shocker supporting frame.

The subject matter claimed in this application was shown in a prior application filed by me on the 10th day of May 1907, Serial No. 372,922.

Having fully described my invention, what I now claim as new and desire to secure by Letters Patent is:

1. In a corn shocker, the combination with the supporting wheels of a frame supported upon the wheels at its forward end, and a push beam connected with its rear end, a caster wheel supporting the push beam raising and lowering devices for raising and lowering the push beam, and a pivoted tilting carriage on said frame, a receiver for the stalks and sliding supports for said receiver mounted on said carriage.

2. In a corn shocker, the combination with the main supporting wheels and with the side beams, axial supports for the wheels connected with the forward ends of the side beams, and a transverse support connected with the rear ends of said beams, a push beam pivotally connected with said transverse support, a caster wheel supporting said push beam, a lever on the push beam controlling the raising and lowering of said pivoted end of the push beam and the transverse support, a receiver for the stalks, and a pivoted stalk dumping carriage supporting said receiver.

3. In a corn shocker, a pivoted dumping carriage, parallel bars upon said carriage, a receiver for the stalks and bars upon the sides of said receiver adapted to slide upon the bars upon said carriage, and means for limiting the sliding movement of said bars.

4. In a corn shocker, a movable supporting frame, a pivoted stalk dumping carriage mounted on said frame, and a receiver for the stalks, sliding connecting devices connecting the receiver with said carriage, and a stalk compressing band within the receiver, and mechanism controlling the winding and unwinding of the ends of the band upon the sides of said receiver.

5. In a corn shocker, a movable frame, a pivoted stalk dumping carriage mounted upon said frame, and a receiver for the stalks, sliding connecting devices connecting said receiver with said carriage, a stalk compressing band, winding drums on the sides of said receiver, and ratchet wheels on said drums, dogs on the sides of said receiver engaging with the ratchet wheels, and means for releasing said dogs from engagement with the ratchet wheels simultaneously.

6. In a corn shocker, the combination with a supporting frame, of a shaft at one end of said frame, brackets pivotally mounted on said shaft, bars connected at their rear ends with said brackets and provided with slots extending in the direction of the length thereof, a receiver for the stalks, bars upon the sides of said receiver mounted upon the bars on said carriage, and adapted to slide thereon, pins upon said latter bars, extending within the slots in the bars on said brackets, controlling the movement of said receiver.

7. In a corn shocker, a receiver for the stalks and a shock retaining post within the receiver, adjustable in the longitudinal direction thereof.

8. In a corn shocker, a receiver for the stalks having perforations in the bottom thereof, a shock retarding post having dowels adapted to be secured within said perforations.

9. In a corn shocker, a pivoted stalk dumping carriage, a receiver for the stalks mounted on said carriage, windlasses upon the side of the receiver, a stalk clamping band and a post within the shocker for sustaining the weight of the shock in the discharge thereof.

10. In a corn shocker, the combination with the side beams, the main supporting wheels mounted on the forward ends thereof and the transverse shaft connected at the rear ends of the side beams of a push beam pivotally connected with said shaft and a caster wheel supporting said push beam, a lever on the push beam for raising and lowering the said transverse shaft, a crank arm on said shaft and connecting devices connected with the crank arm and lever, a supporting bar supported by said shaft and one of said side beams, brackets pivotally connected with said shaft and rollers upon said brackets, movable on said supporting bar, bars connected with the said brackets having slots and a stalk receiver, bars upon the side of said receiver adapted to slide on the bars on said brackets, and means upon the receiver for compressing the stalks and means for limiting the sliding movement of the receiver supporting bars.

11. In a corn shocker, a supporting shaft, brackets pivotally connected with said shaft, bars connected at their rear ends with said brackets, a receiver for the stalks, and bars supporting said receiver adapted to slide on the bars on said brackets, anti-friction rollers on the brackets, forward of the pivotal point of connection of the brackets with said shaft, and a supporting bar for said anti-friction rollers.

ISAAC L. DAWSON.

Witnesses:
HARRY L. GREEN,
FRANCIS A. LEACH.